United States Patent [19]

Geyer

[11] Patent Number: 5,211,727

[45] Date of Patent: May 18, 1993

[54] PROCESS FOR THE MANUFACTURING OF GRINDING ELEMENTS FROM ALUMINIUM OXIDE WITHOUT FIRING ACCESSORIES

[75] Inventor: George A. Geyer, Neustadt, Fed. Rep. of Germany

[73] Assignee: Alcoa Chemie GmbH, Ludwigshafen am Rhein, Fed. Rep. of Germany

[21] Appl. No.: 754,986

[22] Filed: Sep. 6, 1991

[51] Int. Cl.$^5$ ............................................. B24D 18/00
[52] U.S. Cl. ........................................ 51/293; 51/309; 501/127; 501/153
[58] Field of Search ................. 51/293, 309; 501/127, 501/153; 264/63

[56] References Cited

U.S. PATENT DOCUMENTS

| | | | |
|---|---|---|---|
| 3,090,691 | 5/1963 | Weyer | 501/153 |
| 3,093,495 | 6/1963 | Whittemore | 501/153 |
| 3,377,176 | 4/1968 | Wolkodoff et al. | 501/153 |
| 3,491,492 | 1/1970 | Ueltz | 501/153 |
| 3,912,526 | 10/1975 | Clark | 501/127 |
| 4,643,983 | 2/1987 | Zeiringer | 501/127 |
| 4,970,181 | 11/1990 | Pearson | 501/127 |
| 4,996,177 | 2/1991 | Takagi et al. | 501/127 |

Primary Examiner—Mark L. Bell
Assistant Examiner—Deborah Jones
Attorney, Agent, or Firm—Spencer, Frank & Schneider

[57] ABSTRACT

A process for the manufacture of grinding elements composed of aluminum oxide, the process including the steps of (a) mixing aluminum oxide with from 0.5 to 2.5 Wt. % of an organic binder based on the aluminum oxide to provide a mixture; (b) granulating the mixture to form a granulate; (c) molding the granulate into molded pieces having grinding element shapes by applying pressure thereto; and (d) firing the molded pieces at a temperature ranging from 1500° C. to 1850° C. in a vertical kiln to produce grinding elements comprised of aluminum oxide.

14 Claims, 1 Drawing Sheet

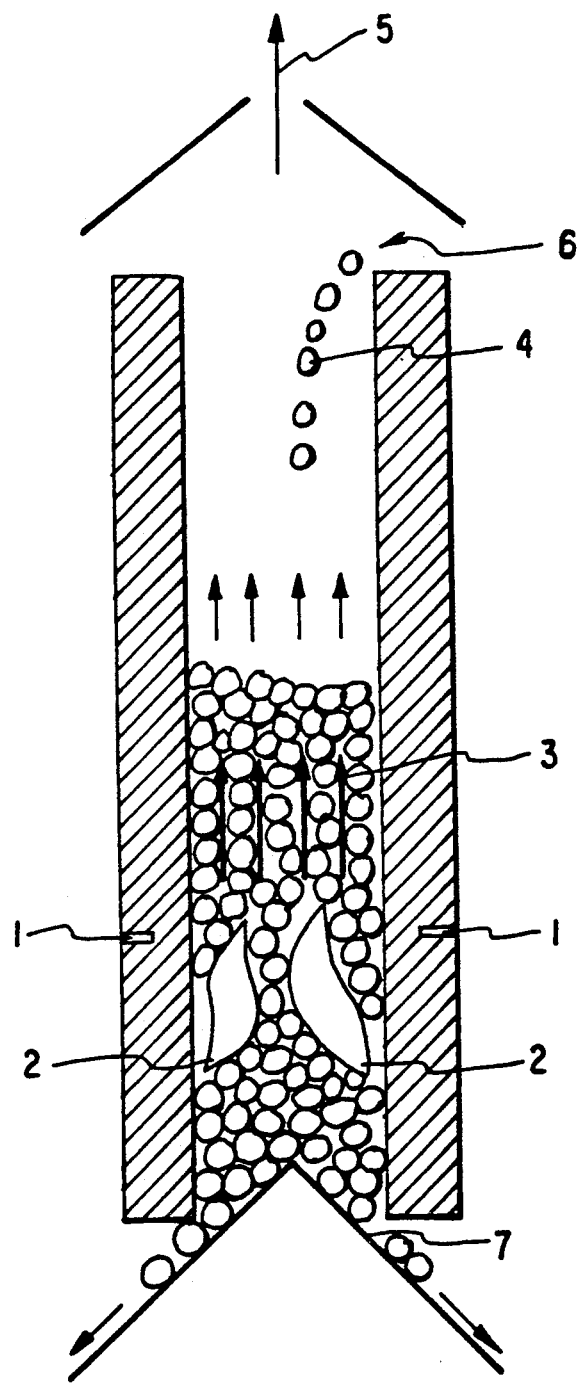

PROCESS FOR THE MANUFACTURING OF GRINDING ELEMENTS FROM ALUMINIUM OXIDE WITHOUT FIRING ACCESSORIES

BACKGROUND OF THE INVENTION

Grinding elements are freely movable bodies with whose help a raw material is pulverized in mills. They have been known for a long time and can consist of wear-resistant steel, porcelain, flint or ceramic oxide. Grinding elements made of ceramic oxide materials are free of clay as a rule, because they can only meet the high requirements set on grinding elements in this condition. It is known that organic binders are used in place of clay.

In accordance with the state-of-the-art of technology, grinding elements are made of ceramic oxide, i.e., such as in a spherical form, from finely ground fused corundum or calcined alumina. The corundum powder (aluminum oxide powder) mixed with a binder is brought into a spherical form through isostatic or axial cold pressing. The spheres, possibly after drying, are then converted into grinding elements by firing, whereby the relatively soft blanks are converted into fixed and hard, particularly wear-resistant grinding elements.

Today, the firing of the blanks most often takes place in a tunnel kiln with gas, oil or electric heating, in which they are pushed along on carriages through a duct with stationary preheating, firing and cooling zones, whereby use is made of firing accessories, particularly firing capsules. The grinding elements are then removed from the firing capsules and sent to their application. The firing capsules, which can also consist of corundum, are filled again with blanks and pushed through the oven again on carriages. According to experience, the firing capsules must be replaced after approximately 40 to 50 passes through the kiln.

A particular disadvantage of the known process is considered to be the fact that firing in tunnel kilns is very work and cost intensive. The replacement of the firing capsules after 40 to 50 passes through the kiln, like their filling before the firing process and their emptying after the firing process, is considered to be technically out-of-date and no longer contemporary, especially with respect to the costs and energy required.

A disadvantage of the grinding elements manufactured in accordance with the current state-of-the-art of technology is often considered to be the fact that they contain only approximately 92 Wt. % aluminum oxide and are thereby "heavily" contaminated. The hardness and wear-resistance of the grinding elements therefor do not satisfy the highest requirements.

It thus became a problem to find a process for the manufacturing of grinding elements through the forming of ground aluminum oxide and subsequent firing of the molded pieces, in which the use of firing accessories was not necessary during the firing process. The formed grinding elements should be fed into the kiln loosely after their manufacturing.

A further purpose of the present invention consists in finding a manufacturing process whose costs lie significantly below those of the manufacturing process corresponding to the state-of-the-art of technology. Furthermore, the new process should be usable with aluminum oxide of higher purities, for example with aluminum oxide having an aluminum oxide content of 99 Wt. % and more. With this type of aluminum oxide, which can be manufactured on an industrial scale by the calcination of aluminum hydroxide and/or recrystallization of aluminum oxide, contamination of the raw material in the grinder through the wear of the grinding elements can be avoided. Aluminum oxide of this type is also designated as sintered alumina.

SUMMARY OF THE INVENTION

Surprisingly, the problem defined can be solved in such a way that ground and possibly disagglomerated aluminum oxide is mixed with 0.5 to 2.5 Wt. %, based on aluminum oxide, of an organic binder or a mixture of organic binders, granulated and pressed to form grinding elements, and the blanks produced are then fired in a vertical kiln at temperatures ranging from 1500° C. to 1850° C. Particularly favorable firing temperatures lie between 1550° C. and 1800° C. Firing temperatures above 1800° C. can be used, although they do not further improve the properties of the grinding elements.

BRIEF DESCRIPTION OF THE DRAWING

The sole drawing FIGURE schematically illustrates a vertical kiln useful in the practice of the method according to the present invention.

DESCRIPTION OF THE PREFERRED EMBODIMENTS

The firing time of the grinding elements in the vertical kiln must necessarily depend upon the firing temperature. It is longer when the temperature is lower. Other factors, such as the kiln design and the dimensions of the molded pieces to be fired also influence the firing time. For this reason, a density of the grinding elements to be reached (target density) is used to establish it. In accordance with the invention, the molded pieces are fired until the density of the grinding elements amounts to at least 3.5, in particular from 3.75 to 3.95, however, having a mean in the vicinity of the theoretical density. According to Armin Petzold and Joachim Ulbricht, "Alumina and Alumina Materials", VEB German Publisher for the Raw Materials Industry, Leipzig, page 84, the latter amounts to 3.99 through 4.00 g.cm-3.

The important feature of the present invention is the conversion of the molded pieces, manufactured from aluminum oxide granulates by the application of pressure, into hard and wear-resistant grinding elements in a vertical kiln. Vertical kilns, in which material in pieces or formed into pieces is moved through a vertical shaft in the opposite direction to a reaction gas, have been known for a long time. They are used for the processing and reduction of ore, in the production of burnt lime, cement, etc. Their use for the manufacture of large numbers of articles in the ceramics industry, i.e., roofing tiles, fire-resistant tiles, or in the porcelain industry is unknown, however. For the expert, it was certainly not to be expected that vertical kilns were to be used for the manufacturing of large numbers of articles in place of the chamber kiln, tunnel kiln, carriage kiln, etc. From the process technology point of view, vertical kilns are moving-bed reactors which have been regarded as completely unsuitable for the firing of shaped blanks until now. That blanks could be converted permanently in a vertical kiln and retain their shape was new and surprising for the expert.

With this new procedure, organic binders or mixtures of organic binders are used exclusively as binders, meaning temporary binders which disappear during the firing process. They are most purposefully used in quantities of 0.5 to 2.5 Wt. %, based on aluminum oxide. Such types of binders are commercially available products, i.e., those based on polyvinyl alcohol, polysaccharides and modified cellulose.

In the manufacture of aluminum oxide granulates in spray dryers, suspensions of aluminum oxide powders in water are used in place of aluminum oxide powders. Liquefying agents are also used here advantageously. Such types of aids are well known to the expert. Depending upon the application, organic or inorganic materials are used in quantities from 0.1 to 1.5 Wt. %, based on solid contents. Frequently used liquefying agents are those based on sodium silicate, humic acid compounds, and phosphates, for example. A liquefying agent suitable for the new process is DOLAPIX CE 64, which is an alkali-free preparation based on carbonic acid, which is commercially available.

The solids content of the aluminum oxide should lie between 65 and 75 Wt. %.

It should be mentioned at this point that other granulating equipment, i.e., granulating plates, can be used when implementing the new process.

The object of the invention shall now be presented clearly and explained in more detail with the help of the schematic drawing and the following example.

Walls 1 of the vertical kiln are indicated with 1 in the drawing. Burners 2 are indicated with 2. Rising combustion gases 3 pass through a moving bed consisting of molded pieces 4 in the vertical kiln. They leave the vertical kiln through mouth 5. The molded pieces 4 are brought into the vertical kiln through 6. They leave it through discharge 7 and are taken to their application after cooling down.

Example

The following were used as raw materials:
1000 kg calcined alumina 99.6%;
2 kg DOLAFIX CE 64 (a liquefying agent based on an alkali-free carbonic acid preparation, commercial product from Zschimmer & Schwarz, GmbH, Lahnstein); and
a binder system, consisting of:
  10 kg OPTAPIX PA 4G (a polyvinyl alcohol, quickly soluble in water, commercial product from Zschimmer & Schwarz GmbH, Lahnstein);
  2 kg OPTAFIX PS 13 (a modified polysaccharide from Zschimmer & Schwarz GmbH, Lahnstein); and
  5 kg MULREX 575 (a wax emulsion, commercial product from the Mobil Oil Company).

The temporary binders OPTAPIX PA 4G and OPTAPIX PS 13 are available in solid form on the market as commercial products and were completely dissolved in water before use. The binder MULREX 575 is delivered in liquid form and was diluted with water in a volume ratio of 1:1.

The water addition was adjusted in the present example in such a way that a suspension (paste) with a solids content of 68% was present after the mixing of the alumina and the liquefying agent.

Before the preparation of the paste, the alumina was disagglomerated, i.e., decomposed into primary crystals in the well-known manner in a mill, a ball mill in this case. About 2 hours were required for this. The preparation of the paste can take place in a mixing vat, as well as in the mill, the latter only under the condition that the mill temperature does not lie higher than 50° C., i.e., that the temperature increase during the grinding process is low.

The weight of one liter of the paste prepared was 1.95 +/−0.05 kg/l.

The processing of the paste to form a dry product (formation of granulates) was carried out in a spray dryer from the Dorst-Maschinen und Anlagenbau GmbH & Co. The air temperature at the inlet nozzle was 350° C. and that at the outlet of the dryer was about 80° C.

A spray granulate with a residual moisture content of 0.5 +/−0.1% and a bulk density of 1.20 +/−0.05 kg/l was obtained. Sixty % of the spray product had a grain diameter ranging from 170 to 220 um, while the grain diameter of the total spray product, therefore of all granulates, ranged between 50 and 500 um.

The pressing of the spray product was carried out in an axial press or an isostatic press from the Dorst-Maschinen und Anlagenbau GmbH & Co. The pressing pressure is either 300, 350, 400, 450, 500, 550 or 600 bar. The molded pieces, whose diameter is 35 mm or whose ratio of diameter to height is 45 mm to 45 mm, shows good hardness properties. With a free fall of one meter, cracks or dents was not observed in them.

The results of the tests are recorded in the enclosed table.

The table shows that the raw density of the molded pieces increases with pressing pressure in accordance with experience. It is surprising that the optimum firing density was already reached at temperatures from 1550° C. to 1600° C. The firing density does not improve with an increase in the temperature. As REM photographs have shown, the properties of the grinding elements deteriorate with an increase in the firing temperature, presumably because of undesirable crystal growth.

TABLE

| Pressing Pressure (Bar) | Raw Density | Firing Density | Shrinkage |
|---|---|---|---|
| Firing temperature 1550° C. | | | |
| 300 | 2.22 | 3.85 | 16.7 |
| 350 | 2.20 | 3.86 | 16.3 |
| 400 | 2.22 | 3.86 | 16.8 |
| 450 | 2.21 | 3.85 | 16.5 |
| 500 | 2.27 | 3.86 | 16.3 |
| 550 | 2.26 | 3.86 | 17.1 |
| 600 | 2.27 | 3.86 | 15.7 |
| Firing temperature 1600° C. | | | |
| 300 | 2.22 | 3.85 | 15.2 |
| 350 | 2.20 | 3.86 | 17.1 |
| 400 | 2.22 | 3.86 | 16.4 |
| 450 | 2.21 | 3.86 | 17.7 |
| 500 | 2.27 | 3.85 | 15.9 |
| 550 | 2.26 | 3.86 | 15.3 |
| 600 | 2.27 | 3.74 | 15.4 |
| Firing temperature 1650° C. | | | |
| 300 | 2.22 | 3.85 | 16.7 |
| 350 | 2.20 | 3.86 | 16.3 |
| 400 | 2.22 | 3.85 | 17.0 |
| 450 | 2.21 | 3.84 | 16.3 |
| 500 | 2.27 | 3.85 | 16.5 |
| 550 | 2.26 | 3.84 | 16.0 |
| 600 | 2.27 | 3.83 | 15.8 |
| Firing temperature 1700° C. | | | |
| 300 | 2.22 | 3.82 | 16.5 |
| 350 | 2.20 | 3.80 | 16.5 |
| 400 | 2.22 | 3.82 | 17.8 |
| 450 | 2.21 | 3.78 | 17.2 |
| 500 | 2.27 | 3.78 | 16.1 |
| 550 | 2.26 | 3.77 | 16.0 |
| 600 | 2.27 | 3.78 | 16.4 |

What is claimed is:

1. A process for the manufacture of grinding elements comprised of aluminum oxide, the process comprising the steps of:
   (a) mixing aluminum oxide with from 0.5 to 2.5 Wt. % of an organic binder based on the aluminum oxide to provide a mixture;
   (b) granulating the mixture;
   (c) molding the granulated mixture by applying pressure thereto; and
   (d) firing the molded pieces at a temperature ranging from 1500° C. to 1850° C. in a vertical kiln to produce grinding elements comprised of aluminum oxide.

2. The process according to claim 1, wherein the molded pieces are fired at a temperature ranging from 1550° C. to 1800° C.

3. The process according to claim 1, further comprising the step of disagglomerating the aluminum oxide by milling same.

4. The process according to claim 1, wherein the mixture formed in step (a) additionally comprises from 0.1 to 1.5 Wt. % of a liquefying agent.

5. The process according to claim 1, wherein the molded pieces are fired in step (d) until grinding elements are produced having a density of at least 3.5.

6. The process according to claim 5, wherein the molded pieces are fired in step (d) until grinding elements are produced having a density ranging between 3.75 and 3.95.

7. The process according to claim 1, wherein granulation in step (b) is carried out in a spray dryer.

8. The process according to claim 7, further comprising the step of forming a suspension of the mixture of step (a) having a solids content ranging between 65 and 75 Wt. % prior to granulating in step (b).

9. The process according to claim 1, wherein granulating in step (b) is carried out on a granulating plate.

10. The process according to claim 1, wherein the aluminum oxide is calcined alumina having an aluminum oxide content of at least 99 Wt. %.

11. The process according to claim 1, wherein the aluminum oxide is fused corundum.

12. The process according to claim 1, wherein firing in step (d) takes place in a vertical kiln having a height to diameter ratio ranging between 10:1 and 8:1.

13. The process according to claim 1, further comprising the step of grinding the aluminum oxide prior to mixing in step (a).

14. The process according to claim 1, wherein the organic binder comprises at least one organic binder selected from the group consisting of polyvinyl alcohols, polysaccharides, modified celluloses, and mixtures thereof.

* * * * *

UNITED STATES PATENT AND TRADEMARK OFFICE
CERTIFICATE OF CORRECTION

PATENT NO. : 5,211,727
DATED : May 18th, 1993
INVENTOR(S) : George A. GEYER

It is certified that error appears in the above-identified patent and that said Letters Patent is hereby corrected as shown below:

On the title page, after item [22] Filed: please add the following:

[30]  Foreign Application Priority Data

Sep. 11, 1990 [EP]   Europe....90117433.4

Signed and Sealed this

First Day of February, 1994

Attest:

BRUCE LEHMAN

Attesting Officer        Commissioner of Patents and Trademarks